US012585437B2

(12) United States Patent
Singh et al.

(10) Patent No.: US 12,585,437 B2
(45) Date of Patent: Mar. 24, 2026

(54) SYSTEM AND METHOD FOR A MACHINE LEARNING SOURCE CODE GENERATION VIA A HOLOCHAIN NETWORK

(71) Applicant: BANK OF AMERICA CORPORATION, Charlotte, NC (US)

(72) Inventors: Shailendra Singh, Thane West (IN); Ankit Dholakiya, Ahmedabad (IN); Arup Francis, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 209 days.

(21) Appl. No.: 18/378,797

(22) Filed: Oct. 11, 2023

(65) Prior Publication Data

US 2025/0123813 A1 Apr. 17, 2025

(51) Int. Cl.
| | |
|---|---|
| *G06F 8/33* | (2018.01) |
| *G06F 11/3604* | (2025.01) |
| *G06N 20/00* | (2019.01) |

(52) U.S. Cl.
CPC ............ *G06F 8/33* (2013.01); *G06F 11/3608* (2013.01); *G06N 20/00* (2019.01)

(58) Field of Classification Search
CPC .......... G06F 8/33; G06F 11/3608; G06F 8/71; G06N 20/00
USPC ........................................................ 717/106
See application file for complete search history.

(56) References Cited

U.S. PATENT DOCUMENTS

| | | | |
|---|---|---|---|
| 11,416,224 | B1 | 8/2022 | Kaitha |
| 11,429,858 | B2 | 8/2022 | Cmielowski et al. |
| 11,461,081 | B2 | 10/2022 | Zhang et al. |
| 11,537,914 | B2 * | 12/2022 | Khawaja ................... G06N 5/04 |
| 11,681,510 | B2 | 6/2023 | Dolby et al. |
| 11,748,065 | B2 | 9/2023 | Evangelopoulos et al. |
| 11,836,467 | B2 | 12/2023 | Allamanis et al. |
| 11,893,384 | B2 | 2/2024 | Ni et al. |
| 11,899,566 | B1 | 2/2024 | Singh et al. |
| 11,947,935 | B2 | 4/2024 | Clement et al. |
| 2019/0332921 | A1 * | 10/2019 | Rodriguez .......... G06F 16/2379 |

(Continued)

OTHER PUBLICATIONS

Dehaerne, Enrique, et al. "Code generation using machine learning: A systematic review." Ieee Access 10 (2022): pp. 82434-82455. (Year: 2022).*
Karaarslan, Enis, and Enis Konacaklı. "Data storage in the decentralized world: Blockchain and derivatives." arXiv preprint arXiv: 2012.10253 (2020). pp. 37-69 (Year: 2020).*
Zaman, Shakila, et al. "Thinking out of the blocks: Holochain for distributed security in IoT healthcare." IEEE Access 10 (2022): pp. 37064-37081. (Year: 2022).*

(Continued)

*Primary Examiner* — Satish Rampuria
(74) *Attorney, Agent, or Firm* — Moore & Van Allen PLLC; Andrew T. Wood

(57) ABSTRACT

Systems, computer program products, and methods are described herein for a decentralized machine learning source code generation framework via a holochain network. The present invention is configured to receive a predetermined code criteria, receive a new code segment from an editor on an endpoint device, retrieve characteristics of the new code segment, determine, using a trained machine learning model, at least one subsequent code segment, based on at least the characteristics of the new code segment, determine, using an evaluation engine, at least one score of the subsequent code segment, wherein the at least one score is associated with the predetermined code criteria, and transmit to the editor of the endpoint device for displaying a predetermined number of the at least one subsequent code segments above a predetermined threshold of the at least one score.

20 Claims, 9 Drawing Sheets

(56) References Cited

U.S. PATENT DOCUMENTS

| | | | | |
|---|---|---|---|---|
| 2019/0347424 A1* | 11/2019 | Bezzi | .................... | G06F 21/577 |
| 2020/0250530 A1* | 8/2020 | Shen | ................... | H04L 63/1433 |
| 2021/0192321 A1 | 6/2021 | Zhang | | |
| 2021/0304073 A1* | 9/2021 | Li | .......................... | G06N 20/00 |
| 2021/0342490 A1* | 11/2021 | Briancon | ............ | G06N 3/0475 |
| 2021/0390478 A1* | 12/2021 | Krishnamoorthy | ......................... | G06Q 10/06313 |
| 2022/0398074 A1 | 12/2022 | Dolby et al. | | |
| 2023/0162040 A1 | 5/2023 | Clement et al. | | |
| 2023/0164336 A1 | 5/2023 | Cricri et al. | | |
| 2023/0281318 A1 | 9/2023 | Clement et al. | | |
| 2023/0297345 A1* | 9/2023 | Khalfan | ............ | G06Q 20/1235 717/107 |
| 2024/0134614 A1 | 4/2024 | Bakshi et al. | | |
| 2024/0184555 A1 | 6/2024 | De Toni et al. | | |

OTHER PUBLICATIONS

Bellagarda, Jagger S., and Adnan M. Abu-Mahfouz. "An updated survey on the convergence of distributed ledger technology and artificial intelligence: Current state, major challenges and future direction." IEEe Access 10 (2022): pp. 50774-50793. (Year: 2022).*

Kyak, Yavuz Selim, et al. "Holochain: a novel technology without scalability bottlenecks of blockchain for secure data exchange in health professions education." Discover Education 1.1 (2022): pp. 1-9. (Year: 2022).*

Kumar, Sushil. "A review on cyber-physical systems based on blockchain: Possibilities and challenges." 2021 IEEE 6th International Conference on Computing, Communication and Automation (ICCCA). IEEE, 2021. pp. 691-696 (Year: 2021).*

\* cited by examiner

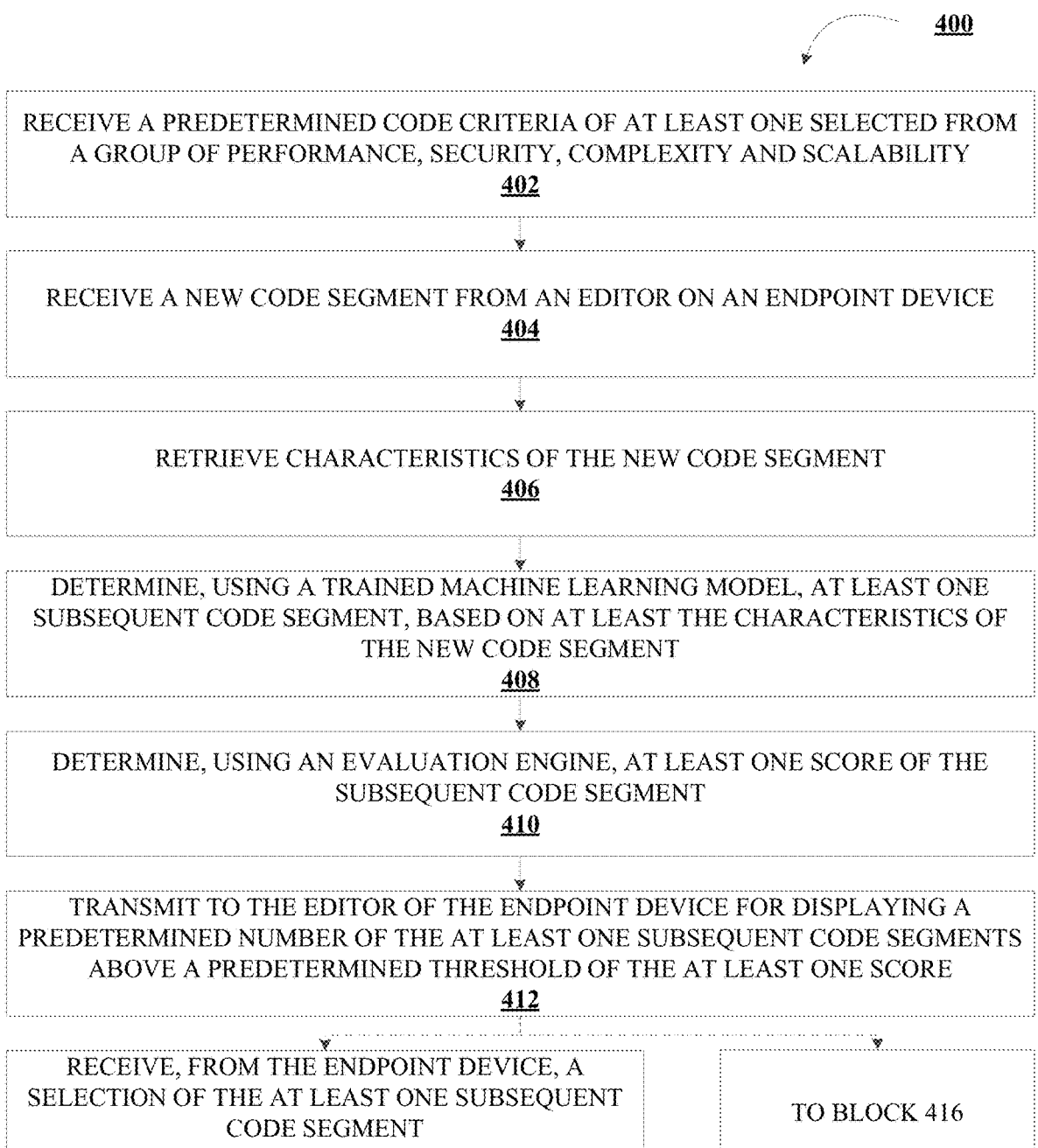

400

RECEIVE A PREDETERMINED CODE CRITERIA OF AT LEAST ONE SELECTED FROM A GROUP OF PERFORMANCE, SECURITY, COMPLEXITY AND SCALABILITY
402

RECEIVE A NEW CODE SEGMENT FROM AN EDITOR ON AN ENDPOINT DEVICE
404

RETRIEVE CHARACTERISTICS OF THE NEW CODE SEGMENT
406

DETERMINE, USING A TRAINED MACHINE LEARNING MODEL, AT LEAST ONE SUBSEQUENT CODE SEGMENT, BASED ON AT LEAST THE CHARACTERISTICS OF THE NEW CODE SEGMENT
408

DETERMINE, USING AN EVALUATION ENGINE, AT LEAST ONE SCORE OF THE SUBSEQUENT CODE SEGMENT
410

TRANSMIT TO THE EDITOR OF THE ENDPOINT DEVICE FOR DISPLAYING A PREDETERMINED NUMBER OF THE AT LEAST ONE SUBSEQUENT CODE SEGMENTS ABOVE A PREDETERMINED THRESHOLD OF THE AT LEAST ONE SCORE
412

RECEIVE, FROM THE ENDPOINT DEVICE, A SELECTION OF THE AT LEAST ONE SUBSEQUENT CODE SEGMENT
414

TO BLOCK 416

RECEIVE, FROM THE ENDPOINT DEVICE, A DECLINING OF THE AT LEAST ONE
SUBSEQUENT CODE SEGMENT
416

RECEIVE, FROM THE ENDPOINT DEVICE, AN ALTERNATIVELY GENERATED CODE
SEGMENT
418

DISTRIBUTE THE ALTERNATIVELY GENERATED CODE SEGMENT ACROSS THE
DISTRIBUTED HOLOCHAIN NETWORK
420

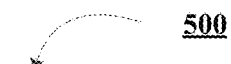

RETRIEVE, FROM A DISTRIBUTED HOLOCHAIN NETWORK, ARCHIVED CODE SEGMENTS
502

GENERATE A TRAINING DATASET COMPRISING THE ARCHIVED CODE SEGMENTS, CHARACTERISTICS OF EACH ARCHIVED DATA SEGMENT, AND A PREVIOUS CODE SEGMENT USED IMMEDIATELY PRIOR TO THE ARCHIVED DATA SEGMENT
504

GENERATE THE TRAINED MACHINE LEARNING MODEL BY TRAINING A MACHINE LEARNING MODEL USING THE TRAINING DATASET
506

FIG. 5

SYSTEM AND METHOD FOR A MACHINE LEARNING SOURCE CODE GENERATION VIA A HOLOCHAIN NETWORK

FIELD OF THE INVENTION

The present invention embraces a system for a decentralized machine learning source code generation framework via a holochain network.

BACKGROUND

In the current landscape of DevOps, the focus centers on streamlining development with CI/CD capabilities, while AI aids in code generation. However, challenges persist in ensuring generated code meets performance standards and defining critical development parameters upfront, such as security and scalability. Bridging these gaps is vital for enhancing DevOps platform capabilities and the overall software development process. Thus, there is a need for a decentralized machine learning source code generation framework via a holochain network.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for a decentralized machine learning source code generation framework via a holochain network is presented. The system may include a processing device, and a non-transitory storage device including instructions that, when executed by the processing device, causes the processing device to perform the steps of receiving a predetermined code criteria of at least one selected from a group consisting of performance, security, complexity and scalability, receiving a new code segment from an editor on an endpoint device, retrieving characteristics of the new code segment, determining, using a trained machine learning model, at least one subsequent code segment, based on at least the characteristics of the new code segment, determining, using an evaluation engine, at least one score of the subsequent code segment, wherein the at least one score is associated with the predetermined code criteria, and transmitting to the editor of the endpoint device for displaying a predetermined number of the at least one subsequent code segments above a predetermined threshold of the at least one score, wherein the performance is determined based on a minimum number of CPU cycles needed to execute the subsequent code segment, wherein the security is determined based on a data flow analysis of the subsequent code segment, wherein the complexity is determined based on a complexity measure of the subsequent code segment, wherein the scalability is determined based on scalability performance testing the subsequent code segment.

In some embodiments, executing the instructions further causes the processing device to perform the steps of retrieving, from a distributed holochain network, archived code segments, and generating a training dataset including the archived code segments, characteristics of each archived data segment, and a previous code segment used immediately prior to the archived data segment.

In some embodiments, the characteristics of each archived data segment may include at least one selected from a group consisting of the performance, the security, the complexity, and the scalability.

In some embodiments, executing the instructions further causes the processing device to perform the steps of generating the trained machine learning model by training a machine learning model using the training dataset.

In some embodiments, executing the instructions further causes the processing device to perform the steps of generating, using a clustering engine of the machine learning model, clusters of new code segments based on the predetermined code criteria.

In some embodiments, executing the instructions further causes the processing device to perform the steps of receiving, from the endpoint device, a selection of the at least one subsequent code segment, and acquiring the at least one subsequent code segment by a component acquisition engine, wherein the at least one subsequent code is distributed across a distributed holochain network.

In some embodiments, executing the instructions further causes the processing device to perform the steps of receiving, from the endpoint device, a declining of the at least one subsequent code segment, receiving, from the endpoint device, an alternatively generated code segment, and acquiring the alternatively generated code segment, wherein the alternatively generated code segment is distributed across a distributed holochain network.

In another aspect, a computer program product for a decentralized machine learning source code generation framework via a holochain network is presented. The computer program product may include a non-transitory computer-readable medium including code causing an apparatus to receive a predetermined code criteria of at least one selected from a group consisting of performance, security, complexity and scalability, receive a new code segment from an editor on an endpoint device, retrieve characteristics of the new code segment, determine, using a trained machine learning model, at least one subsequent code segment, based on at least the characteristics of the new code segment, determine, using an evaluation engine, at least one score of the subsequent code segment, wherein the at least one score is associated with the predetermined code criteria, and transmit to the editor of the endpoint device for displaying a predetermined number of the at least one subsequent code segments above a predetermined threshold of the at least one score, wherein the performance is determined based on a minimum number of CPU cycles needed to execute the subsequent code segment, wherein the security is determined based on a data flow analysis of the subsequent code segment, wherein the complexity is determined based on a complexity measure of the subsequent code segment, wherein the scalability is determined based on scalability performance testing the subsequent code segment.

In some embodiments, the code further causes the apparatus to retrieve, from a distributed holochain network, archived code segments, and generate a training dataset including the archived code segments, characteristics of each archived data segment, and a previous code segment used immediately prior to the archived data segment.

In some embodiments, the characteristics of each archived data segment may include at least one selected from a group consisting of the performance, the security, the complexity, and the scalability.

In some embodiments, the code further causes the apparatus to generate the trained machine learning model by training a machine learning model using the training dataset.

In some embodiments, the code further causes the apparatus to generate, using a clustering engine of the machine learning model, clusters of new code segments based on the predetermined code criteria.

In some embodiments, the code further causes the apparatus to receive, from the endpoint device, a selection of the at least one subsequent code segment, and acquire the at least one subsequent code segment by a component acquisition engine, wherein the at least one subsequent code is distributed across a distributed holochain network.

In some embodiments, the code further causes the apparatus to receive, from the endpoint device, a declining of the at least one subsequent code segment, receive, from the endpoint device, an alternatively generated code segment, and acquire the alternatively generated code segment, wherein the alternatively generated code segment is distributed across a distributed holochain network.

In yet another aspect, a method for a decentralized machine learning source code generation framework via a holochain network is presented. The method may include receiving a predetermined code criteria of at least one selected from a group consisting of performance, security, complexity and scalability, receiving a new code segment from an editor on an endpoint device, retrieving characteristics of the new code segment, determining, using a trained machine learning model, at least one subsequent code segment, based on at least the characteristics of the new code segment, determining, using an evaluation engine, at least one score of the subsequent code segment, wherein the at least one score is associated with the predetermined code criteria, and transmitting to the editor of the endpoint device for displaying a predetermined number of the at least one subsequent code segments above a predetermined threshold of the at least one score, wherein the performance is determined based on a minimum number of CPU cycles needed to execute the subsequent code segment, wherein the security is determined based on a data flow analysis of the subsequent code segment, wherein the complexity is determined based on a complexity measure of the subsequent code segment, wherein the scalability is determined based on scalability performance testing the subsequent code segment.

In some embodiments, the method further may include retrieving, from a distributed holochain network, archived code segments, and generating a training dataset including the archived code segments, characteristics of each archived data segment, and a previous code segment used immediately prior to the archived data segment.

In some embodiments, the characteristics of each archived data segment may include at least one selected from a group consisting of the performance, the security, the complexity, and the scalability.

In some embodiments, the method further may include generating the trained machine learning model by training a machine learning model using the training dataset.

In some embodiments, the method further may include generating, using a clustering engine of the machine learning model, clusters of new code segments based on the predetermined code criteria.

In some embodiments, the method further may include receiving, from the endpoint device, a selection of the at least one subsequent code segment, and acquiring the at least one subsequent code segment by a component acquisition engine, wherein the at least one subsequent code is distributed across a distributed holochain network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
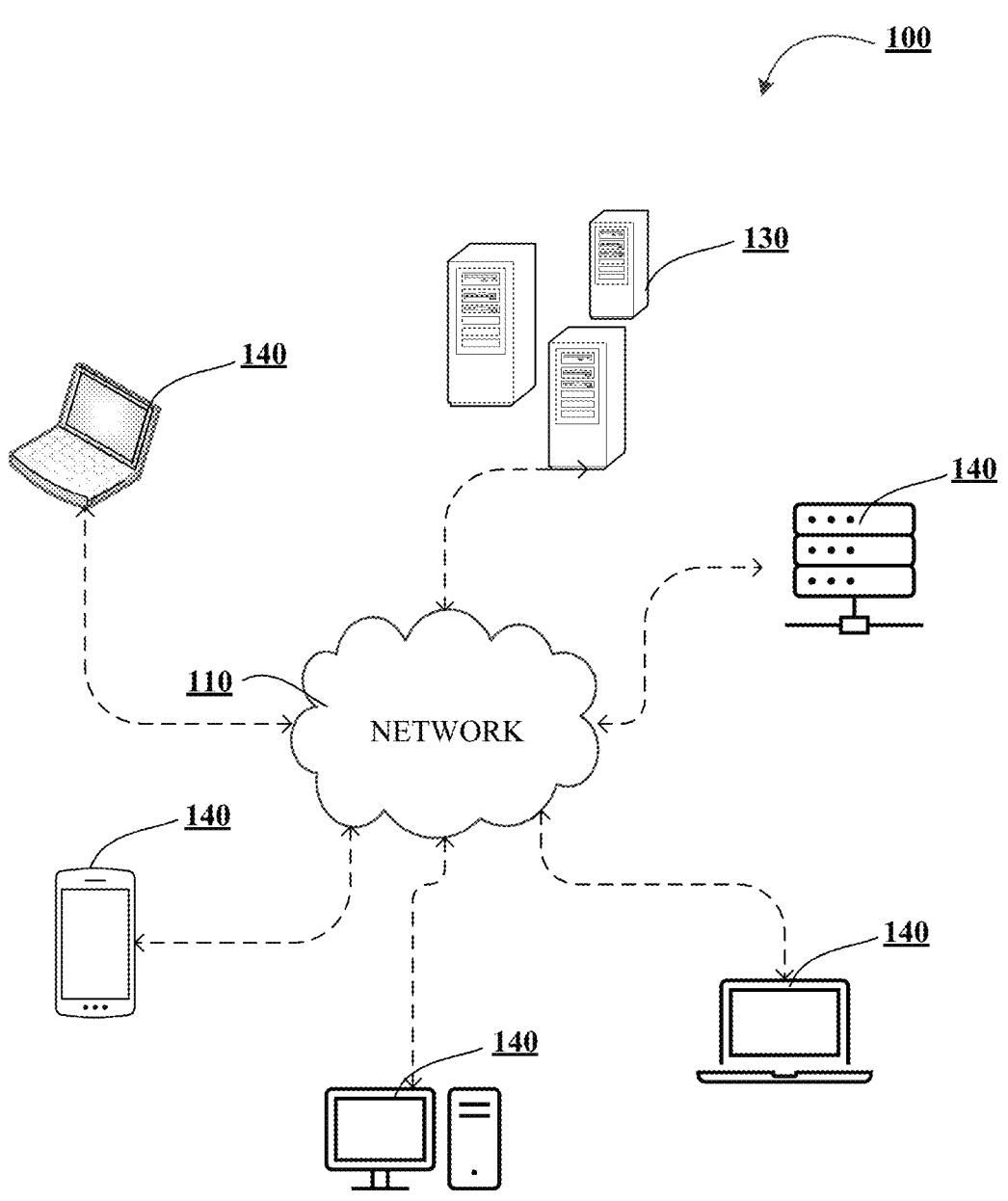
Figure 1B:
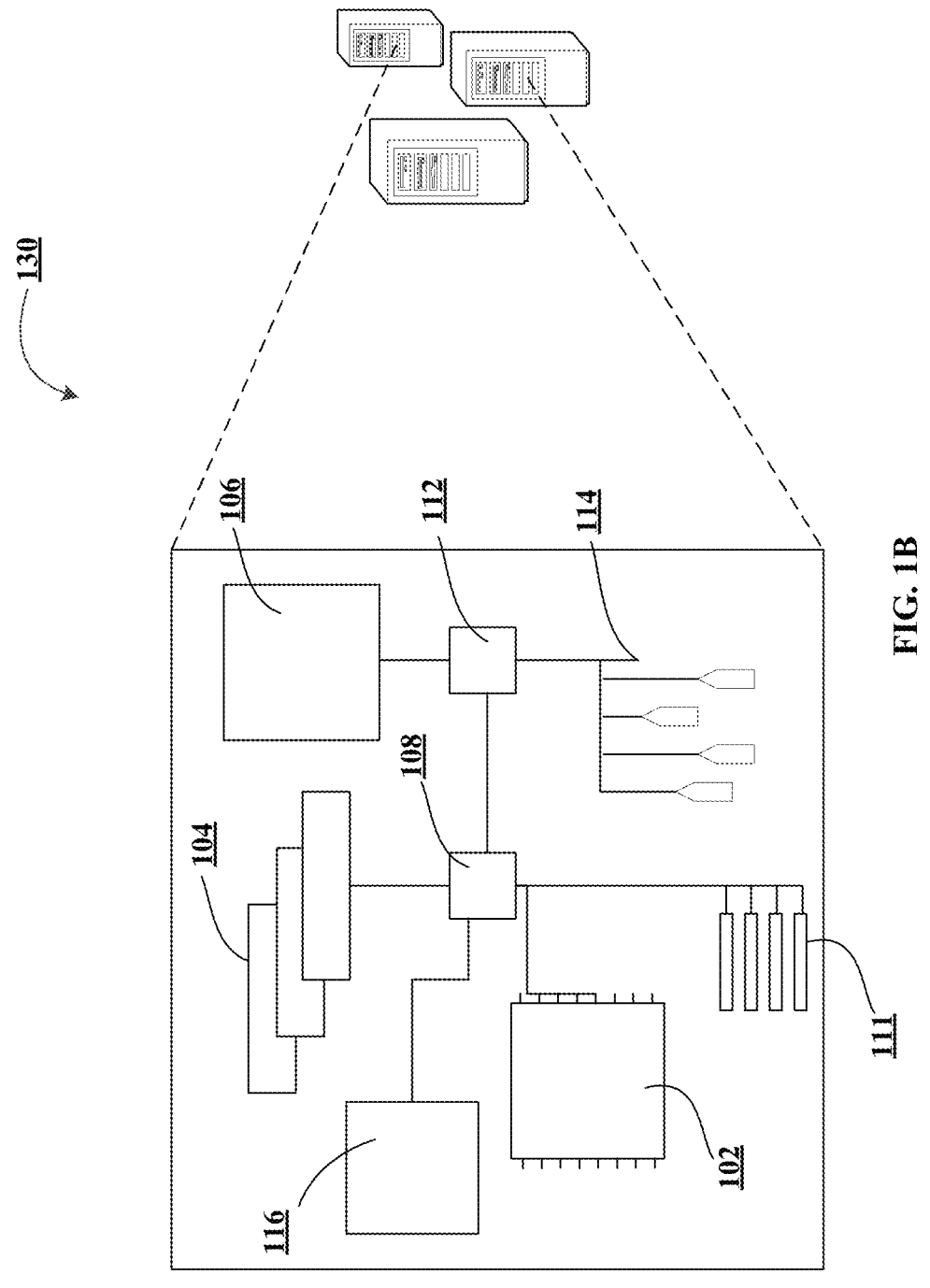
Figure 1C:
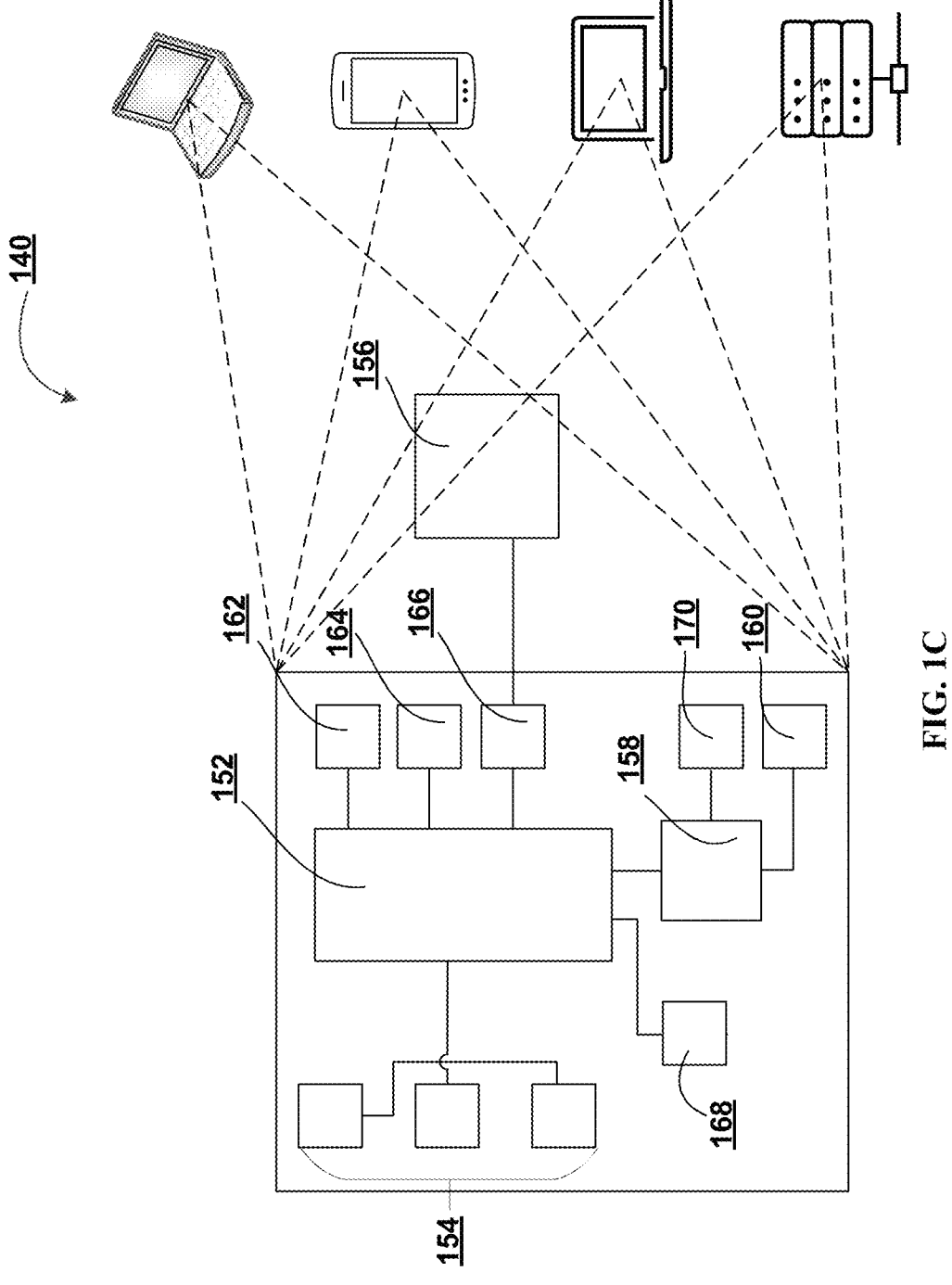
Figure 2A:
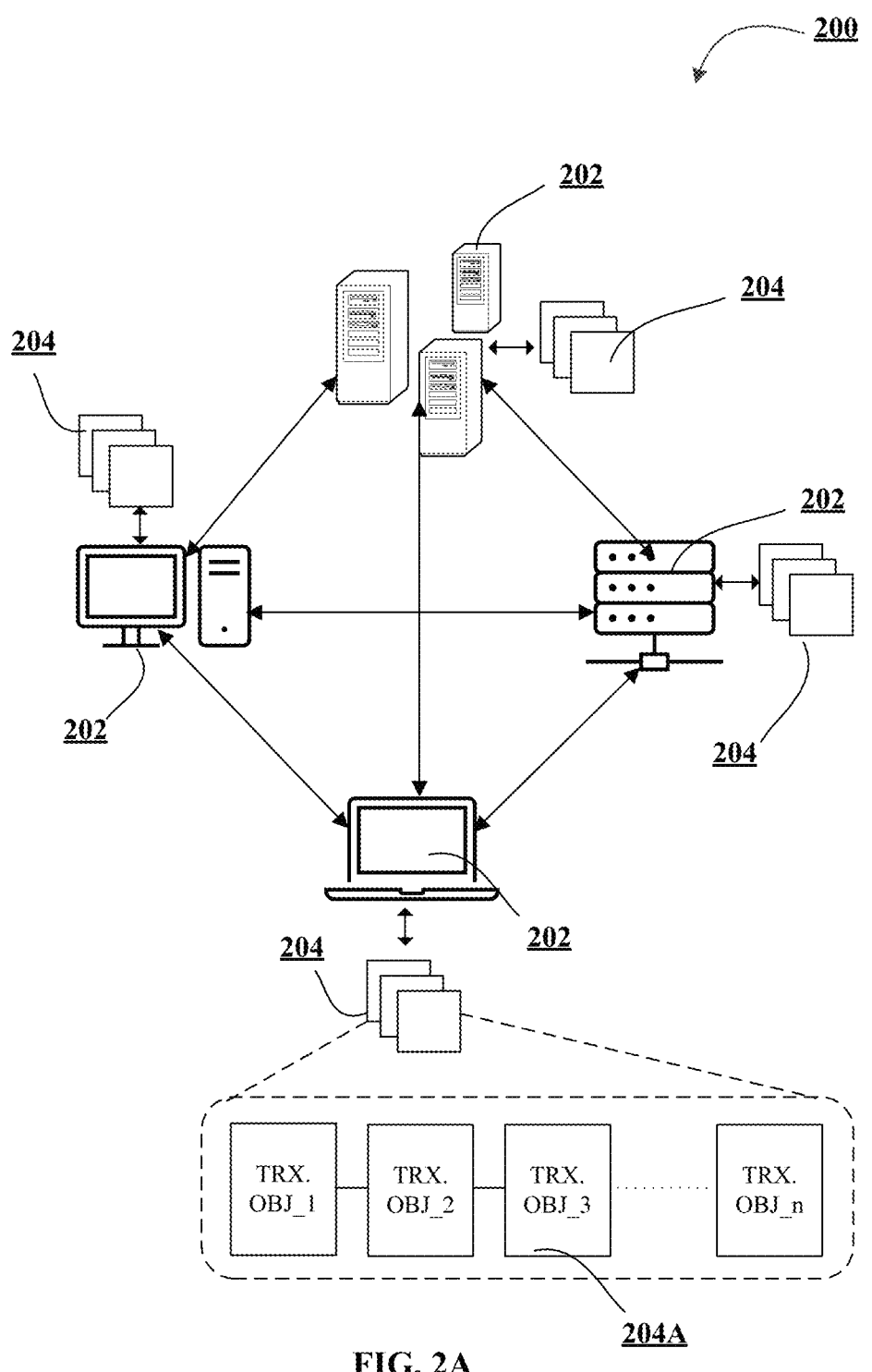
Figure 2B:
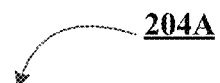
Figure 2B:
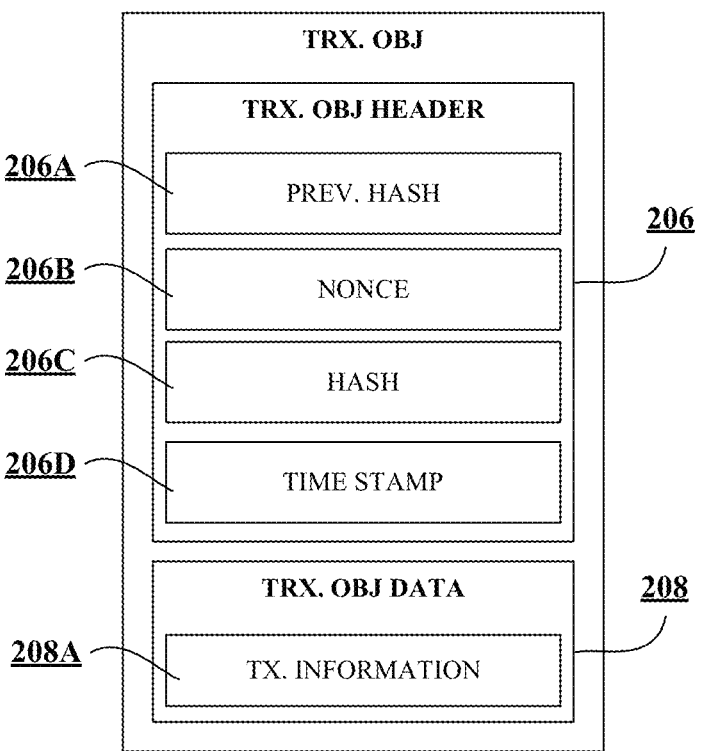
Figure 3:
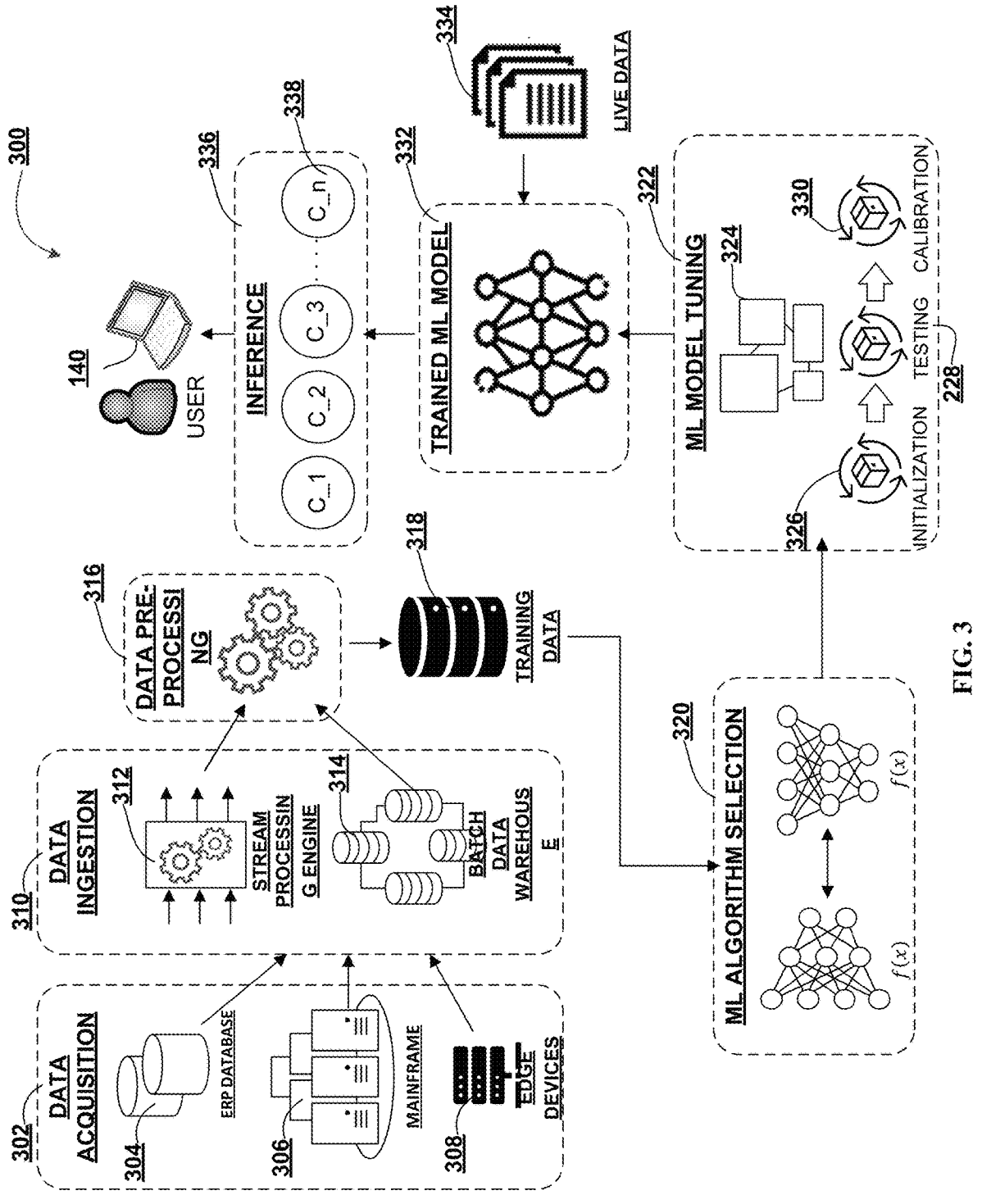
Figure 4B:
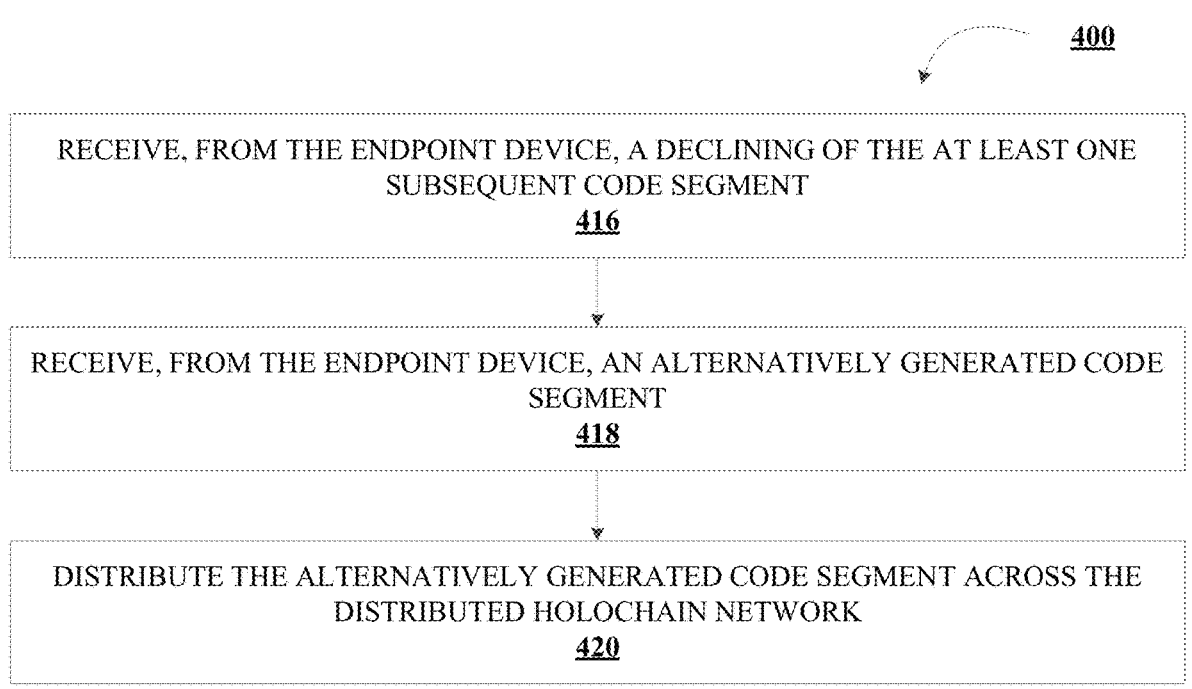

Having thus described embodiments of the invention in general terms, reference will now be made the accompanying drawings, wherein:

FIGS. 1A-1C illustrate technical components of an exemplary distributed computing environment for a decentralized machine learning source code generation framework via a holochain network, in accordance with an embodiment of the invention;

FIGS. 2A-2B illustrate an exemplary distributed ledger technology architecture, in accordance with an embodiment of the invention;

FIG. 3 illustrates an exemplary machine learning (ML) subsystem architecture, in accordance with an embodiment of the invention;

FIGS. 4A-4B illustrate a flow diagram for a decentralized machine learning source code generation framework via a holochain network, in accordance with an embodiment of the invention; and FIG. 5 illustrates a flow diagram for training a machine learning model in a holochain network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "hashing engine" refers to a computational algorithm designed to convert data of any size into a fixed-size string of characters, commonly referred to as a hash. One such hashing engine is SHA-256 (Secure Hash Algorithm 256-bit). However, other hashing algorithms are available as well, including by not limited to MD5 a SHA-1. The hashing engine takes the input data and applies a series of mathematical operations to generate a unique and irreversible hash value. The resulting hash serves as a digital fingerprint of the original data, providing a concise representation that is highly unlikely to collide with hashes from different inputs. Hashing engines are used in various applications, including data integrity verification, password storage, digital signatures, and cryptographic protocols, as they offer efficient and secure ways to handle and verify data integrity.

As used herein, a "machine learning model" may refer to a computational system that employs algorithms and statistical techniques to process and analyze data in order to discover patterns, extract insights, and make predictions or decisions. The machine learning model operates through various embodiments, such as neural networks, support vector machines, decision trees, or ensemble methods, each with their own strengths and applicability. Implemented through parallel processing architectures, distributed computing frameworks, or specialized hardware accelerators like graphics processing units (GPUs), the machine learning model optimizes the training and inference processes. The machine learning model utilizes optimization algorithms, such as stochastic gradient descent or evolutionary algorithms, to iteratively adjust model parameters and minimize prediction errors. Additionally, it may incorporate feature engineering, dimensionality reduction, or regularization techniques to enhance model performance and mitigate overfitting. By leveraging large-scale datasets, the machine learning model learns complex representations and generalizes from training examples to make accurate predictions or decisions on unseen data.

A crucial aspect of the machine learning model is its training methodology, which involves iteratively refining model parameters through exposure to labeled or unlabeled data. Supervised learning methods employ annotated training data to guide the model's optimization process, while unsupervised learning methods aim to extract meaningful patterns from unlabeled data. Additionally, semi-supervised and reinforcement learning approaches leverage both labeled and unlabeled data, or feedback signals from an environment, respectively. The training process typically involves iterative epochs, where the machine learning model updates the model's weights using gradient-based optimization techniques, such as backpropagation or evolutionary strategies. Regularization techniques like dropout, batch normalization, or early stopping are employed to prevent overfitting and improve generalization. Hyperparameter tuning, through methods like grid search or Bayesian optimization, further enhances model performance. By adapting to the underlying data distribution, the machine learning model can capture intricate relationships and exhibit robust predictive capabilities in various domains and applications.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The technology described herein implements an approach to utilize distributed ledger technology to facilitate source code sharing among different participants in a holochain network. Instead of relying on a machine learning model such as a large language model to generate source code segments that are non-specific to the various implementations thereof, the technology described herein performs assessments, via scoring, of various generated source code segments to determine if the potential source code segments adhere to requirements defined prior to their generation. Additionally, the approach implemented herein facilitates the sharing of generated source code segments across the holochain network, allowing a machine learning model to be trained on various source code in individualized contexts to more effectively generate source code segments in similar contexts.

Prior to the invention described herein, the state of technology in generating source code segments through generative artificial intelligence/machine learning was inadequate. Although DevOps platforms were designed to allow programmers to be efficient and expedite the delivery of their work. While some entities are actively engaged in the development of products that use artificial intelligence ("AI") to assist developers in writing source code, AI's role in this context primarily revolves around code generation and is largely agnostic to specific requirements and use cases. Accordingly, despite some advancements in the firls, there is a significant gap in the current technology landscape.

The technical challenge that persists in the current DevOps platform ecosystem revolves around two key issues. First, while AI is increasingly being used to generate source code, there remains a critical gap in ensuring that the generated code meets performance requirements. Second, there is a deficiency in tools and mechanisms that enable development teams to define crucial development parameters upfront. These parameters encompass aspects such as security, performance, scalability, and complexity, which are essential for crafting robust and efficient software solutions. The absence of a comprehensive framework for defining and integrating these parameters within the integrated development environment poses a significant challenge in delivering high-quality software efficiently in the DevOps landscape. Addressing these challenges is critical for advancing the capabilities of DevOps platforms and enhancing the overall software development process.

The invention disclosed herein provides a solution. The technical solution described here involves the distribution of machine learning-generated source code segments across a holochain network, which allows each member of the holochain network the ability to send and receive various locally selected or created source code segments across the network. By distributing such source code segments, the machine learning model used to generate the source code is able to be trained on at predetermined intervals on newly generated source code segments, their use-cases (in context with other source code segments sequentially prior to or subsequent the newly generated source code), and their scores related to important parameters such as security, performance, scalability, and complexity. Training the machine learning model on these parameters, features, and use-cases provides users of the system the ability to select source code segments highly pertinent to their use cases, with characteristics in-line with the requirements of any given source code.

Accordingly, the present disclosure provides for the intelligent and use-case specific generation of source code. A predetermined code criteria of performance, security, complexity and/or scalability is received. A new code segment provided to an editor on an endpoint device is received. Then, the system retrieves characteristics of the new code segment. Using a trained machine learning model, the system determines at least one subsequent code segment. This determination is based on the characteristics of the previously provided new code segment. The trained machine learning model may be trained on a training set of archived code segments retrieved from a distributed holochain network. Characteristics of each archived data segment and a previous code segment used immediately prior to the archived data segment may be used in the training dataset for training the machine learning model, such as the performance, the security, the complexity, and the scalability, which align with the various predetermined code criteria that may be selected. The machine learning model may generate clusters of new code segments based on the predetermined code criteria using a clustering engine of the machine learning model. An evaluation engine is used to determine a score of the subsequent code segment that was generated, such that the score provides an analysis of the criteria indicated previously as predetermined criteria. Next, subsequent code segments above a predetermined threshold of the score are transmitted to the editor of the endpoint device and displayed. A selection of a subsequent code segment may be received from the endpoint device. A component acquisition engine may then acquire the subsequent code segment, as the subsequent code may be distributed across a distributed holochain network. In instances where the subsequent code segment is not desired, the system may receive an indication from the endpoint device that the use of the subsequent code segment displayed on the interface has been declined. In such, instances, an alternatively generated code segment, such as that which is input into the source code application through other means, is received and acquired by the system. The system then distributes this alternatively generated code segment across the distributed holochain network.

Thus, the present invention provides a technical solution to a technical problem. As described herein, the technical problem includes the inability for machine learning models to assist in source code segment generation with specific attributes and characteristics in alignment with those requested through an application. Additionally, the existing machine learning-generated source code implementations do not prevent the duplication of efforts across a network, where similar source code segments may be needed to meet similar needs. The technical solution presented herein allows for the use-case specific source code segments to be not only generated and provided to an endpoint device, but generated by a machine learning model in a manner which is specific to the requirements provided and trained on a frequent basis to re-use portions of recently used source code segments throughout a holochain network. Hence, the technical solution presented herein allows for the machine learning model to be trained on such requirements and their relationships with various source code segments generated throughout the network and identified in a distributed hash table. As such, the present technical solution allows for the generation of source code (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, and (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for a decentralized machine learning source code generation framework via a holochain network, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and one or more storage devices 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the one or more storage devices 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110.

Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130, and endpoint device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary architecture of Holochain, a unique framework for building decentralized applications (dApps) that relies on a Distributed Hash Table (DHT) infrastructure. In this embodiment, Holochain represents an approach to decentralized computing, where applications are constructed on a DHT foundation. DHTs encompass a suite of protocols and supporting infrastructure that empower computing devices, known as peers, scattered across a network to propose, validate transactions, and update records in a synchronized manner. Holochain and DHTs are purposefully designed around a decentralized model, fostering collaboration and trust-building among network peers. This collaboration is facilitated by a peer-to-peer protocol that maintains a cryptographically secured distributed ledger of transactions. These transactions are represented as transaction entries that are interconnected. Each transaction entry contains information about the preceding entry, creating a chain of transactions that reinforces each other. Consequently, Holochain-based distributed ledgers are resistant to data modification because altering one entry retroactively necessitates altering all subsequent transaction entries.

To enable transactions and agreements among peers without relying on a central authority or external enforcement mechanisms, Holochain implements hApps (Holochain applications) and validation rules. hApps consist of computer code responsible for automating parts or all of an agreement. This code resides on the Holochain network, where it is replicated across multiple nodes (peers). This replication ensures the code's security, permanence, and immutability, leveraging the strengths of a distributed ledger based on a DHT. Additionally, as new transaction entries are added to the distributed ledger, the code is effectively executed. If parties initiate a transaction that meets specific criteria, the code executes the corresponding steps. Conversely, in the absence of such an initiated transaction, the code remains dormant.

Holochain has found diverse applications, including distributed domain name management, decentralized crowdfunding, synchronous/asynchronous communication, decentralized real-time resource sharing, and serving as a general-purpose deployment platform for decentralized applications. In various embodiments, a Holochain-based distributed ledger can be categorized as public, consortium, or private. A public distributed ledger allows anyone worldwide to read, send transactions, and participate in the consensus process. A private distributed ledger centralizes permissions with a single entity, which may be public or restricted. A consortium distributed ledger's consensus process is controlled by a pre-selected set of nodes, often associated with member institutions, requiring a threshold number of members to validate transactions. Reading access may be public or restricted in consortium distributed ledgers, rendering them partially decentralized.

As depicted in FIG. 2A, the exemplary Holochain and DHT architecture 200 comprises a distributed ledger 204 maintained across authorized devices (nodes) 202, which can be computing devices, such as Holochain nodes. Each node 202 may hold a complete or partial copy of the distributed ledger 204. Transactions are initiated at a node and communicated to various nodes within the Holochain network. Any node can validate a transaction, record it in its copy of the distributed ledger, and broadcast the transaction, along with its validation (in the form of a transaction entry), and other data to other nodes.

In FIG. 2B, an exemplary transaction entry 204A consists of a transaction header 206 and transaction entry data 208.

The transaction header 206 encompasses a cryptographic hash of the previous transaction entry 206A, a nonce 206B generated randomly during entry creation, cryptographic hash of the current transaction entry 206C combined with the nonce 206B, and a timestamp 206D. The transaction entry data 208 contains recorded transaction information 208A. Once generated, a transaction entry 204A is considered signed and permanently linked to its nonce 206B and hash 206C. Subsequently, the transaction entry 204A is deployed on the distributed ledger 204, acquiring a distributed ledger address for recording purposes, indicating its location on the distributed ledger 204.

In the context of the present invention, a distributed hash is a type of Holochain programming network where a peer-to-peer approach is utilized. Each entity or group may have different Holochains, on which people might be developing various applications. In some cases, there might be a team divided across various regions and entities, each of which has developed its own programs. Some team members could be working on developing compute components related to authorization, while others might focus on authentication.

In the Holochain environment, various entities are engaged in fetching information and interacting with different Holochains. Each Holochain is controlled by a distinct entity, team, group, or the like. The interaction therebetween may incorporate the use of smart contracts. These smart contracts essentially act as agreements that facilitate cooperation between the entities. When a programmer seeks a reusable component from a repository, which represents the second entity in this context, a contractual agreement must be established. This contractual agreement is essentially a set of secure code configuration rules. The programmer defines these rules, prioritizing security as the primary concern, followed by performance considerations. This ensures that the code usage and amalgamation are governed by predefined security and performance criteria, allowing for controlled and secure interactions.

As the code development progresses, programmers commit their work to the system, which involves contributing to the repository. In this distributed system, each entity or team maintains its separate blockchain. Each of these blockchains contains a subset of information, as not all nodes possess the entirety of the data. While entities interact with each other within the Holochain environment, information is extracted from each node individually. This decentralized approach enables teams to focus on their specific development tasks while still participating in the larger ecosystem. The extracted information is then aggregated and utilized by the system as a whole, such that all entities benefit from the collective knowledge and resources available in the distributed repository.

Within this distributed repository, multiple entities are actively involved in writing, publishing, and committing code. This collaborative effort results in a dynamic and constantly evolving codebase. To keep track of code ownership and its origins, the system maintains a record of which entity released a particular piece of code. This information allows for transparency and accountability, ensuring that each entity can trace the ownership and responsibility for the code contributions within the Holochain environment.

FIG. 3 illustrates an exemplary machine learning (ML) subsystem architecture 300, in accordance with an embodiment of the invention. The machine learning subsystem 300 may include a data acquisition engine 302, data ingestion engine 310, data pre-processing engine 316, ML model tuning engine 322, and inference engine 336.

The data acquisition engine 302 may identify various internal and/or external data sources to generate, test, and/or integrate new features for training the machine learning model 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 304, 306, and 308 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In machine learning, the quality of data and the useful information that can be derived therefrom directly affects the ability of the machine learning model 324 to learn. The data pre-processing engine 316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 322 may be used to train a machine learning model 324 using the training data 318 to make predictions or decisions without explicitly being programmed to do so. The machine learning model 324 represents what was learned by the selected machine learning algorithm 320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 322 may repeatedly execute cycles of experimentation 326, testing 328, and tuning 330 to optimize the performance of the machine learning algorithm 320 and refine the results in preparation for deployment of those results for consumption or decision making. To this end, the ML model tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical business decisions based on live data 334. To this end, the machine learning subsystem 300 uses the inference engine 336 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 338) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 338) live data 334 based on how similar they are to one another to solve exploratory challenges where little is known about the data, provide a description or label (e.g., $C\_1, C\_2 \ldots C\_n$ 338) to live data 334, such as in classification, and/or the like. These categorized outputs, groups (clusters), or labels are then presented to the user input system 130. In still other cases, machine learning models that perform regression techniques may use live data 334 to predict or forecast continuous outcomes.

It will be understood that the embodiment of the machine learning subsystem 300 illustrated in FIG. 3 is exemplary and that other embodiments may vary. As another example, in some embodiments, the machine learning subsystem 300 may include more, fewer, or different components.

FIGS. 4A-4B illustrate a flow diagram for a decentralized machine learning source code generation framework via a holochain network, in accordance with an embodiment of the invention. The process may begin at block 402, where the system 130 receives a predetermined code criteria of at least one selected from a group consisting of performance, security, complexity and scalability. It shall be appreciated that certain code segments may require a particular emphasis on performance when critical applications, such as payment processing, are involved. Certain requirements for complexity, security, etc. The present invention ensures that the generated source code segments meet or exceed predefined thresholds for each selected parameter. The user may prioritize one or more of these parameters and provide this prioritization through an interface of an endpoint device 140 to be received by the system 130. The user may select a predetermined threshold, as one non-limiting example of a threshold on a scale of 1 to 10.

In some embodiments, an acquisition engine may be implemented to receive the predetermined code criteria. As will be described herein, the system 130 then utilizes a machine learning model to assemble code segments that align with the selected criteria. For example, the machine learning model may prioritize performance when creating and constructing code segments, for example, to ensure that a code segment is below a predetermined threshold corresponding to a for maximum number of CPU cycles to reduce latency.

Accordingly, and as will be described herein with respect to other portions of the computer-implemented process, the determination of code performance may be based on the minimum number of CPU cycles required to execute a code segment. Additionally, or alternatively, security may be assessed through data flow analysis of the code segment to identify and mitigate potential vulnerabilities. Additionally, or alternatively, complexity may be evaluated using measures such as the Cyclomatic complexity score, providing insights into code segment maintainability and comprehensibility. Additionally, or alternatively, scalability may assessed through performance testing of the generated code segments under varying workloads to ensure it can handle increased demands.

To maintain code quality within desired boundaries, the system 130 allows users to set predetermined thresholds for one or more parameter (i.e., predetermined code criteria). A source code rule engine, in some embodiments, may configure the code segment to adhere to these predefined thresholds and associated rules, ensuring that the generated code segment meets the specified criteria for performance, security, complexity, and scalability.

Continuing at block 404, the system 130 may receive a new code segment from an editor on an endpoint device 140. During the process of writing code, such code being ultimately comprised of a series of code segments, the system 130 receives new code segment(s) from the endpoint device 140 on which it has been entered. In some embodiments, the new code segment ascertained is the beginning lines of code for which a user desires to extrapolate (e.g., finish). Additionally, or alternatively, the new code segment may include the entirety of the source code written prior to the portion of the code which the user desires to be generated by the system 130. In other embodiments, the new code segment may include a predetermined number of lines of the source code written prior to the portion of the code which the user desires to be generated by the system 130.

Next, the process may continue at block 406, where the system 130 may retrieve characteristics of the new code segment. In some embodiments, this retrieval includes not only the specific code lines of the new code segment, but also other portions of the source code, such as a predetermined number of lined prior to the new code segment, that provide the underlying context, logic, and syntax that are relevant to the developer's coding task.

The system 130 understands what the developer is writing, whether it's a partial code segment or the entire code base. When a user initiates coding by providing a new code segment in their editor, the system 130 processes the code (the new code segment and/or other portions of the source code) in the background through a trained machine learning model 332. This trained machine learning model 332 ingests the logic, syntax, and purpose of the new code segment. In the background, the system 130 generates a requirement prompt based on the new code segment provided by the user. This requirement prompt is not visible to the user but serves as a guiding input for the machine learning model.

At block 408, the system 130 may determine, using the trained machine learning model 332, at least one subsequent code segment, based on at least the characteristics of the new code segment. The system 130 then sends the requirement prompt to the trained machine learning model 332, which identifies potential predicted source code, e.g., at least one subsequent code segment, for that particular prompt. It does so by searching through various repositories and utilizing a source code scanning engine that continuously scans available code resources throughout the holochain and a source code logic engine that analyzes the logic used within the new code segment to infer context.

It shall be appreciated that the trained machine learning model 332 described herein is a type of generative artificial intelligence ("AI") system. In the context of generative AI, the trained machine learning model 332 resembles advanced Natural Language Processing ("NLP") transformers. These transformer-based systems operate on the principle of receiving prompts, which are effectively specifications or directives provided to a program or system. Subsequently, the trained machine learning model 332 responds to said prompt by generating output content in accordance with the aforementioned directive.

Furthermore, it shall be appreciated, in view of the entirety of the disclosure, that the trained machine learning model 332 the generative system is identifying what is the code segment that should be provided to the entirety of the source code to progress the coding of the source code.

Turning now to FIG. 5, FIG. 5 illustrates a flow diagram 500 for training a machine learning model in a holochain network, in accordance with an embodiment of the invention. The process may begin at block 502, where the system 130 retrieves, from a distributed holochain network, archived code segments.

Next, at block 504, a training dataset is generated. This dataset may consist of the archived code segments, accompanied by characteristics specific to each archived code segment, as well as information regarding the code segment immediately preceding it. The characteristics may include performance, security, complexity, and scalability metrics, each vital for code assessment. Notably, these characteristics may each be assigned distinct weightings to facilitate tailored model training.

For example, consider the development of a web-based application. In this scenario, the development team might assign higher weightings to performance and security attributes. This ensures that the machine learning model focuses on optimizing the application for fast response times and identifying potential security vulnerabilities. Additionally, or alternatively, in a different use case where the primary concern is code maintainability, such as in long-term software projects, complexity and scalability attributes may receive higher weightings. Here, the model would emphasize generating code segments that are easy to understand, modify, and scale over time.

At block 506, the machine learning model is trained using the training dataset. During the training process, the model incorporates the weighted characteristics of the code segments, adapting its learning patterns to align with the specified criteria. This results in a trained machine learning model 332 that is capable generating code segments that fulfill the desired objectives, whether those pertain to performance, security, simplicity, or scalability, within the holochain network.

Returning now to FIGS. 4A-4B to continue with the description of block 408, in some embodiments, the system 130 may include a component acquisition engine. This component acquisition engine is tasked with identifying a reusable component. Essentially, this engine actively monitors and listens to the activities within the distributed Holochain network. It continually assesses the code segment contributions made by individuals and identifies potential reusable components. As part of its functionality, the system 130 will then proceed to extract the identified reusable component, incorporating it into the subsequent steps.

In some embodiments, the machine learning model of the system 130 relies on the component acquisition engine to retrieve data associated with code segments from the distributed Holochain network. The primary purpose of the component acquisition engine is to facilitate the acquisition of such data for the machine learning model's tasks.

The component acquisition engine may construct queries based on predefined criteria or structured requests, tailored to retrieve data associated with code segments. These queries may involve keywords or specific parameters relevant to the new code segment. Once the query is crafted, the component acquisition engine may send the query to the distributed Holochain network. This step may involve interacting with various network resources, such as APIs, databases, websites, or other data sources, to retrieve the data associated with code segments.

Upon receiving responses, the component acquisition engine may collect and process the retrieved data associated with code segments. This data may be presented in a variety of formats, including JSON, XML, HTML, raw binary data, and so forth.

In some embodiments, the acquired data associated with code segments may need transformation to make it compatible with the generative AI model. The component acquisition engine may undertake tasks like data parsing, cleaning, or reformatting to prepare the data for input into the model.

In some embodiments, scalability and optimization may be necessary. Depending on workload and complexity, the component acquisition engine may require scaling to handle larger volumes of requests.

The machine learning model operates within the distributed holochain computing environment and in conjunction with the component acquisition engine to facilitate code generation through code reuse. Initially, a search operation is initiated when a user or system 130 requires a specific software component. During this search, the engine scans the distributed environment, typically a code repository or library, to identify code segments that may be relevant to the task. These code segments are often not directly copied but are instead modified to suit the current requirement. However, in some embodiments, the identified code segment is directly copied.

Once suitable code segments are identified, the engine retrieves them from the distributed Holochain environment. It may not limit itself to a single segment but can pull multiple components that appear to be relevant to the task at hand. These components represent pre-existing code modules, each designed to perform specific functions or tasks within a software application. In some embodiments, there is a source code mapping engine working to trace the origins of the code segment incorporated and how it's being utilized, allowing the pinpointing of the ownership of the code used and the sources from which it was obtained.

Subsequently, the engine may apply a clustering algorithm to group together similar code segments based on their functionality or characteristics. Moreover, it has the capability to merge selected code components, combining them in a manner that enhances their compatibility and efficiency, and comports the code segments to the user's predetermined code criteria. This process optimizes the utilization of existing code, minimizing redundancy and improving code modularity. In some embodiments, the number of clusters may be predetermined from 1 to 5 clusters.

In embodiments where a cluster contains only one subsequent code segment, this may indicate that there is a direct correlation between that subsequent code segment and the system's requirements. In such cases, there is no need for further modification or adaptation because the single code segment serves as a direct match to the system's needs. Consequently, this singular subsequent code segment can be directly inserted into the system, thereby streamlining the development process.

Next, the process may continue at block 410, where the system 130 may determine, using an evaluation engine, at least one score of the subsequent code segment, wherein the at least one score is associated with the predetermined code criteria. This evaluation process allows for the evaluation and subsequent selection of subsequent code segments that meet the predetermined code criteria, such as performance, quality standards, etc. The subsequent code segments that are output from block 408 are assessed (i.e., scored) by the system 130 for the impact of the changes that would occur as a result of integrating each of the potential subsequent code segments into the source code. This involves the system 130 examining various factors such as execution time, CPU usage, memory consumption, input-output operations, network utilization, code complexity, error rates, scalability, and power consumption. Each potential subsequent code segment in the repository is score based on these parameters, resulting in a scoring system ranging from 0 to 10.

In some embodiments, at least one score may be evaluated based on the corresponding subsequent code segment in context of the other portions of the source code already present in the editor application. In other embodiments, the at least one score may be evaluated based on the corresponding subsequent code segment in isolation by itself, agnostic to any source code present prior to or after the subsequent code segments position within the source code. In either scenario, in the context of code execution within an editor application, the process typically involves several steps. First, if the code is written in a compiled language, it undergoes compilation, where the source code is translated into machine-readable instructions or intermediate code. Alternatively, in the case of interpreted languages, the code is executed line by line without prior compilation. During execution, the code operates within a runtime environment or virtual machine, ensuring that it can access the necessary resources and libraries required for its operation.

In some embodiments, the system 130 may determine scores for each of the potential subsequent code segments of block 408, and further reduce, based on the predetermined thresholds set forth in block 402, the number of subsequent code segments from block 408 prior to displaying the subsequent code segment(s) on the user interface. For example, the predetermined threshold for performance may be a score 8/10, while only three subsequent code segments out of the five possibilities have a performance score of 8/10 or higher. Accordingly, the two non-compliant subsequent code segments may be discarded. As such, the system 130 leverages these scores to recommend suitable code segments.

Continuing at block 412, the system 130 may transmit to the editor of the endpoint device 140 for displaying a predetermined number of the at least one subsequent code segments above a predetermined threshold of the at least one score. In some embodiments, a user may specify as a part of the predetermined code criteria a threshold, also predetermined, above which any and all subsequent code segments provided to the user by the system 130 must be. For example, a user may specify that the Cyclomatic complexity score, when normalized on a scale from 1 to 10, must be above an 8. Accordingly, the system 130, having generated subsequent code segments that are both above and below a normalized Cyclomatic complexity score of 8, disregards those that are below 8 and instead only display those subsequent code segments having above a normalized Cyclomatic complexity score of 8. In other embodiments, the system 130 may display all of the subsequent code segments without regards to a score of any of the predetermined code criteria.

In some embodiments, the system 130 may present on the user interface a predetermined number of subsequent code segments. For example, it may be predetermined that only 4 subsequent code segments should be displayed on the interface of the endpoint device 140. For embodiments where only 4 or fewer subsequent code segments have been generated that are above the predetermined threshold of the score, the system 130 may display all 4 or fewer. In embodiments where more than 4 subsequent code segments have been generated that are above the predetermined threshold of the score, the system 130 may display only the 4 with the highest score.

Accordingly, prior to inserting any subsequent code segment into the source code, the system 130 may offer a range of potential subsequent code segment options to the programmer via displaying on the user interface of the endpoint device 140, by displaying one code segment, two code segments, three code segments, four code segments, and so forth. These options typically include several different subsequent code segments that may be utilized. In some embodiments, proximate each of the subsequent code segments the system 130 displays on the user interface may be at least one score as assessed by the system 130 previously, associated with the subsequent code segment to which it is proximate. In this way, a user may be able to select with particularity the subsequent code segment that has the predetermined characteristics most desirable to the user, such as performance, scalability, and so forth.

For instance, if the programmer were to consider choosing to insert subsequent code segment option number one, the system 130, prior to being selected for insertion of the subsequent code segment, provides insights into how the entire source code will perform with this specific addition to provide the developer with the knowledge of how their choices impact the overall system characteristics (e.g., predetermined code criteria).

At block 414, the system 130 may receive, from the endpoint device 140, a selection of the at least one subsequent code segment. If the user accepts a subsequent code segment, the system 130 directly inserts the code segment inside the program where the programmer is writing.

It shall be appreciated that this integration process is ongoing, with the programmer adding and modifying code segments as needed. The process is a continuous process occurring within this distributed system, constantly checking with the distributed library with a type of source code scanning engine, which continuously scans for changes and updates. For example, a user may input a portion of a new code segment, then request the system 130 described herein inject the remainder, then subsequently have the system 130 generate various subsequent code segments for selection by the user and subsequent injection into the source code. This may continue until the user is satisfied with the source code written.

In some embodiments, and as shown in block 416, the system 130 may receive, from the endpoint device 140, a declining of the at least one subsequent code segment. If the system 130 generates subsequent code segment(s) that the user finds to be unacceptable for the source code in the application, the system 130 may allow for the selection of a "decline" indicator or button to forego any injection of subsequent code segments. Thereafter, in some embodiments, and as shown in block 418, the user may manually enter a code segment as an "alternatively generated code segment," where the system 130 receives the alternatively generated code segment from the endpoint device 140. After completion of the alternatively generated code segment, as shown in block 420, the system 130 may store in the distributed holochain network this alternatively generated code segment for training of the machine learning model in conjunction with the component acquisition engine. In this way, a future trained machine learning model 332 and component acquisition engine may reference this alternatively generated code segment in the holochain network for similar use-cases. In some embodiments, the alternatively generated code segment may be distributed across the distributed holochain network.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for a decentralized machine learning source code generation framework via a holochain network, the system comprising:

a processing device;

a non-transitory storage device containing instructions when executed by the processing device, causes the processing device to perform the steps of:

receiving a predetermined code criteria of at least one selected from a group consisting of performance, security, complexity and scalability;

receiving a new code segment from an integrated development environment executing on an endpoint device;

retrieving characteristics of the new code segment;

determining, using a trained machine learning model, at least one subsequent code segment, based on at least the characteristics of the new code segment;

determining, using an evaluation engine, at least one score of the subsequent code segment, wherein the at least one score is associated with the predetermined code criteria; and automatically transmitting, over a network interface, a predetermined number of the at least one subsequent code segments above a predetermined threshold of the at least one score to the integrated development environment executing on the endpoint device for display, wherein the performance is determined based on a minimum number of CPU cycles needed to execute the subsequent code segment, wherein the security is determined based on a data flow analysis of the subsequent code segment, wherein the complexity is determined based on a complexity measure of the subsequent code segment, wherein the scalability is determined based on scalability performance testing the subsequent code segment.

2. The system of claim 1, wherein executing the instructions further causes the processing device to perform the steps of:

retrieving, from a distributed holochain network, archived code segments; and generating a training dataset comprising the archived code segments, characteristics of each archived data segment, and a previous code segment used immediately prior to the archived data segment.

3. The system of claim 2, wherein the characteristics of each archived data segment comprises at least one selected from a group consisting of the performance, the security, the complexity, and the scalability.

4. The system of claim 3, wherein executing the instructions further causes the processing device to perform the steps of:

generating the trained machine learning model by training a machine learning model using the training dataset.

5. The system of claim 1, wherein executing the instructions further causes the processing device to perform the steps of:

generating, using a clustering engine of the machine learning model, clusters of new code segments based on the predetermined code criteria.

6. The system of claim 1, wherein executing the instructions further causes the processing device to perform the steps of:

receiving, from the endpoint device, a selection of the at least one subsequent code segment; and acquiring the at least one subsequent code segment by a component acquisition engine, wherein the at least one subsequent code is distributed across a distributed holochain network.

7. The system of claim 1, wherein executing the instructions further causes the processing device to perform the steps of:

receiving, from the endpoint device, a declining of the at least one subsequent code segment;

receiving, from the endpoint device, an alternatively generated code segment; and acquiring the alternatively generated code segment, wherein the alternatively generated code segment is distributed across a distributed holochain network.

8. A computer program product for a decentralized machine learning source code generation framework via a holochain network, the computer program product comprising a non-transitory computer-readable medium comprising code causing an apparatus to:

receive a predetermined code criteria of at least one selected from a group consisting of performance, security, complexity and scalability;

receive a new code segment from an integrated development environment executing on an endpoint device;

retrieve characteristics of the new code segment;

determine, using a trained machine learning model, at least one subsequent code segment, based on at least the characteristics of the new code segment;

determine, using an evaluation engine, at least one score of the subsequent code segment, wherein the at least one score is associated with the predetermined code criteria; and automatically transmit, over a network interface, a predetermined number of the at least one subsequent code segments above a predetermined threshold of the at least one score to the integrated development environment executing on the endpoint device for display, wherein the performance is determined based on a minimum number of CPU cycles needed to execute the subsequent code segment, wherein the security is determined based on a data flow analysis of the subsequent code segment, wherein the complexity is determined based on a complexity measure of the subsequent code segment, wherein the scalability is determined based on scalability performance testing the subsequent code segment.

9. The computer program product of claim 8, wherein the code further causes the apparatus to:

retrieve, from a distributed holochain network, archived code segments; and generate a training dataset comprising the archived code segments, characteristics of each archived data segment, and a previous code segment used immediately prior to the archived data segment.

10. The computer program product of claim 9, wherein the characteristics of each archived data segment comprises at least one selected from a group consisting of the performance, the security, the complexity, and the scalability.

11. The computer program product of claim 10, wherein the code further causes the apparatus to:

generate the trained machine learning model by training a machine learning model using the training dataset.

12. The computer program product of claim 8, wherein the code further causes the apparatus to:

generate, using a clustering engine of the machine learning model, clusters of new code segments based on the predetermined code criteria.

13. The computer program product of claim 8, wherein the code further causes the apparatus to:

receive, from the endpoint device, a selection of the at least one subsequent code segment; and acquire the at least one subsequent code segment by a component acquisition engine, wherein the at least one subsequent code is distributed across a distributed holochain network.

14. The computer program product of claim 8, wherein the code further causes the apparatus to:

receive, from the endpoint device, a declining of the at least one subsequent code segment;

receive, from the endpoint device, an alternatively generated code segment; and acquire the alternatively generated code segment, wherein the alternatively generated code segment is distributed across a distributed holochain network.

15. A method for a decentralized machine learning source code generation framework via a holochain network, the method comprising:

receiving a predetermined code criteria of at least one selected from a group consisting of performance, security, complexity and scalability;

receiving a new code segment from an integrated development environment executing on an endpoint device;

retrieving characteristics of the new code segment;

determining, using a trained machine learning model, at least one subsequent code segment, based on at least the characteristics of the new code segment;

determining, using an evaluation engine, at least one score of the subsequent code segment, wherein the at least one score is associated with the predetermined code criteria; and automatically transmitting, over a network interface, a predetermined number of the at least one subsequent code segments above a predetermined threshold of the at least one score to the integrated development environment executing on the endpoint device for display, wherein the performance is determined based on a minimum number of CPU cycles needed to execute the subsequent code segment, wherein the security is determined based on a data flow analysis of the subsequent code segment, wherein the complexity is determined based on a complexity measure of the subsequent code segment, wherein the scalability is determined based on scalability performance testing the subsequent code segment.

16. The method of claim 15, wherein the method further comprises:

retrieving, from a distributed holochain network, archived code segments; and generating a training dataset comprising the archived code segments, characteristics of each archived data segment, and a previous code segment used immediately prior to the archived data segment.

17. The method of claim 16, wherein the characteristics of each archived data segment comprises at least one selected from a group consisting of the performance, the security, the complexity, and the scalability.

18. The method of claim 17, wherein the method further comprises:

generating the trained machine learning model by training a machine learning model using the training dataset.

19. The method of claim 15, wherein the method further comprises:

generating, using a clustering engine of the machine learning model, clusters of new code segments based on the predetermined code criteria.

20. The method of claim 15, wherein the method further comprises:

receiving, from the endpoint device, a selection of the at least one subsequent code segment; and acquiring the at least one subsequent code segment by a component acquisition engine, wherein the at least one subsequent code is distributed across a distributed holochain network.

* * * * *